(12) United States Patent
Grammel

(10) Patent No.: US 8,954,493 B2
(45) Date of Patent: Feb. 10, 2015

(54) METHOD OF ESTABLISHING DISJOINT DATA CONNECTIONS BETWEEN CLIENTS BY A NETWORK

(75) Inventor: Gert Grammel, Ditzingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/376,764

(22) PCT Filed: Jun. 17, 2010

(86) PCT No.: PCT/EP2010/058528
§ 371 (c)(1),
(2), (4) Date: Dec. 7, 2011

(87) PCT Pub. No.: WO2010/149562
PCT Pub. Date: Dec. 29, 2010

(65) Prior Publication Data
US 2012/0089673 A1    Apr. 12, 2012

(30) Foreign Application Priority Data

Jun. 24, 2009    (EP) .................................... 09305594

(51) Int. Cl.
*G06F 15/16*    (2006.01)
*H04L 12/701*    (2013.01)
*H04L 12/735*    (2013.01)
*H04L 12/707*    (2013.01)

(52) U.S. Cl.
CPC ............ *H04L 45/00* (2013.01); *H04L 45/1283* (2013.01); *H04L 45/24* (2013.01)
USPC ............................. 709/203; 709/220; 709/201

(58) Field of Classification Search
CPC .... G11C 27/02; G11C 11/24; G11C 11/4076; G11C 11/412; G11C 11/413; G11C 16/24; G11C 16/26; G11C 29/02; G11C 29/023; G11C 29/028; G11C 29/12005; G11C 5/025; G11C 5/14; G11C 7/06; G11C 7/1072
See application file for complete search history.

(56) References Cited

U.S. PATENT DOCUMENTS

| | | | | |
|---|---|---|---|---|
| 7,124,187 | B1 * | 10/2006 | Kodialam et al. ............. | 709/226 |
| 7,389,321 | B2 * | 6/2008 | Estrada et al. ................ | 709/205 |
| 7,398,321 | B2 * | 7/2008 | Qiao et al. .................... | 709/239 |
| 7,830,869 | B2 * | 11/2010 | Barker ........................... | 370/389 |
| 8,098,576 | B2 * | 1/2012 | Sun ................................ | 370/225 |
| 8,179,789 | B2 * | 5/2012 | Graham ......................... | 370/229 |
| 8,208,371 | B2 * | 6/2012 | Li et al. ......................... | 370/217 |
| 8,243,586 | B2 * | 8/2012 | Ramakrishnan et al. ..... | 370/217 |
| 8,340,104 | B2 * | 12/2012 | Kusama et al. ................ | 370/400 |
| 2003/0009582 | A1 * | 1/2003 | Qiao et al. ..................... | 709/233 |
| 2003/0128706 | A1 | 7/2003 | Mark et al. | |
| 2004/0246896 | A1 | 12/2004 | Hoang et al. | |

* cited by examiner

*Primary Examiner* — Douglas W Owens
*Assistant Examiner* — Monica C King
(74) *Attorney, Agent, or Firm* — Carmen Patti Law Group, LLC

(57) ABSTRACT

A method for establishing disjoint data connections between two clients by a network is proposed. The method comprises different steps at different devices. A first client device sends via a client-network interface one or more connection request messages to a network for requesting at least two disjoint data connections to a second client device. The one or more connection request messages contain first indicating data, indicating a first predetermined set of network resources, and second indicating data, indicating a second predetermined set of network resources, which is disjoint to said first set of network resources.

10 Claims, 16 Drawing Sheets

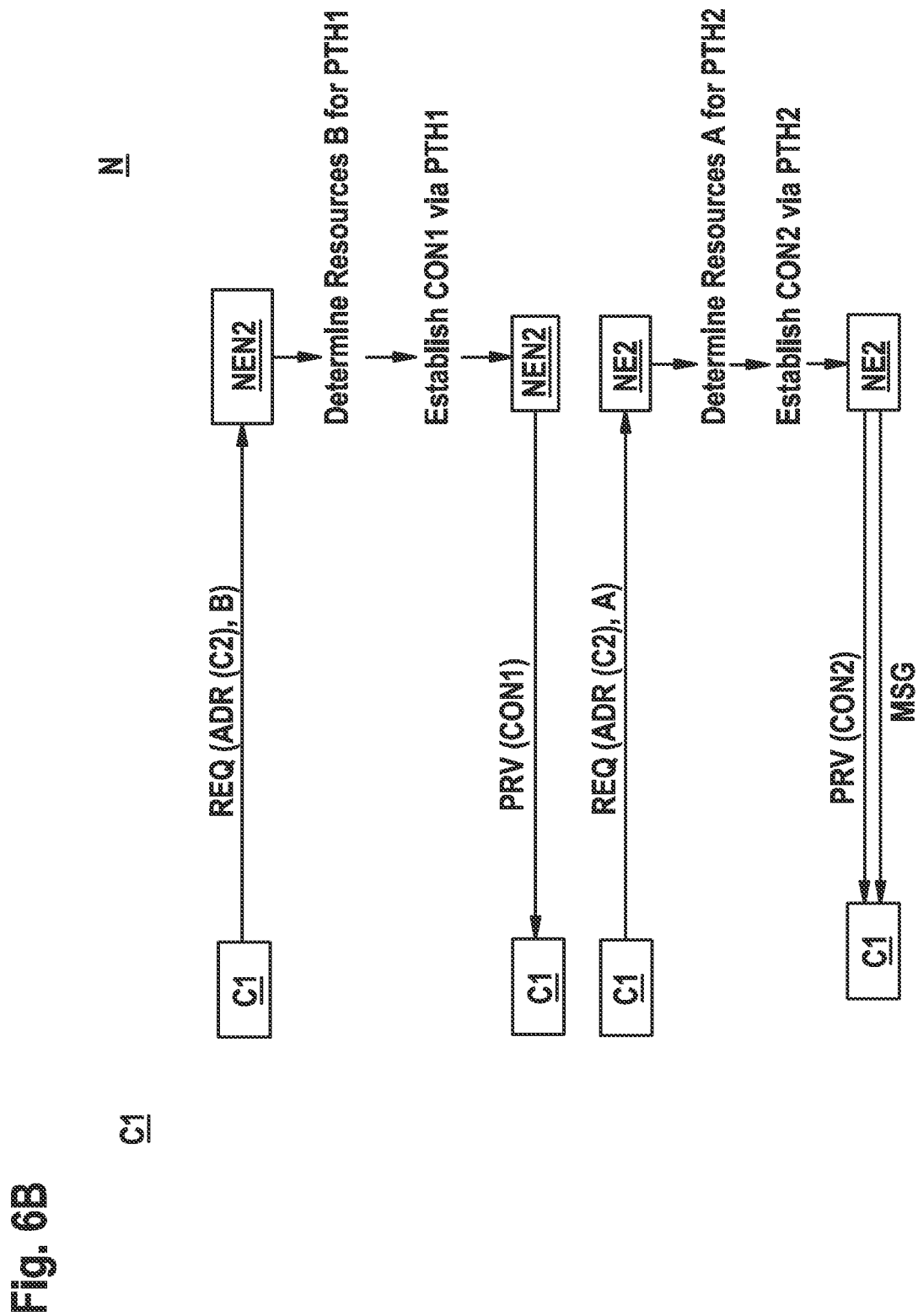

METHOD OF ESTABLISHING DISJOINT DATA CONNECTIONS BETWEEN CLIENTS BY A NETWORK

FIELD OF THE INVENTION

The invention relates to a method and a network end point node for establishing disjoint data connections between clients.

BACKGROUND

In certain situations, a client may wish to establish data connections through a transport network which are disjoint to each other. The disjoint data connections shall be established via disjoint data paths by the network to a first client device, wherein the disjoint data connections connect the first client device with a second client device, which is also connected to the network.

For a client, which is connected through a number of ports to a network end point node, it is known that the client may request from such a network end point node a number of data connections to a second client, which is connected to a second network end point node of the network.

The advantage of the client having two disjoint data connections through the network to the second client is, that the client may use the two disjoint data connections as redundant data connections. This is desirable in the case, that the client wishes to protect data transmission via the first data connection in the case of failure of data transmission via the first data connection. In such a case, the client may switch data transmission from the first data connection to the second data connection. By the client knowing that the two data connections are disjoint to each other, the client can be sure that a failure of a single network resource within the network will not have an impact on both data connections, since they are disjoint to each other, meaning that their connections have been established via disjoint data paths.

It is an aim of the invention to improve the currently known method for establishing disjoint data connections through a network.

SUMMARY

According to the invention, a method for establishing disjoint data connections between two clients by a network is proposed. The method comprises different steps at different devices.

A first client device sends via a client-network interface one or more connection request messages to a network for requesting at least two disjoint data connections to a second client device. The one or more connection request messages contain first indicating data, indicating a first predetermined set of network resources, and second indicating data, indicating a second predetermined set of network resources, which is disjoint to said first set of network resources.

The network establishes the first data connection via a first data path using network resources selected from the first set of network resources. Furthermore, the network establishes the second data connection via a second data path using network resources selected from the second set of network resources.

The provided method has the advantage, that a client can request from a network endpoint node disjoint data connections by simply sending one or more request messages containing different indicating data.

The client does not have to give instructions to the network endpoint node as to which explicit network resources shall be used for a data connection and its corresponding data path.

BRIEF DESCRIPTION OF THE DRAWINGS

FIG. 6B shows steps of a signalling protocol according to the further alternative solution.

DESCRIPTION OF EMBODIMENTS

Figure 1:
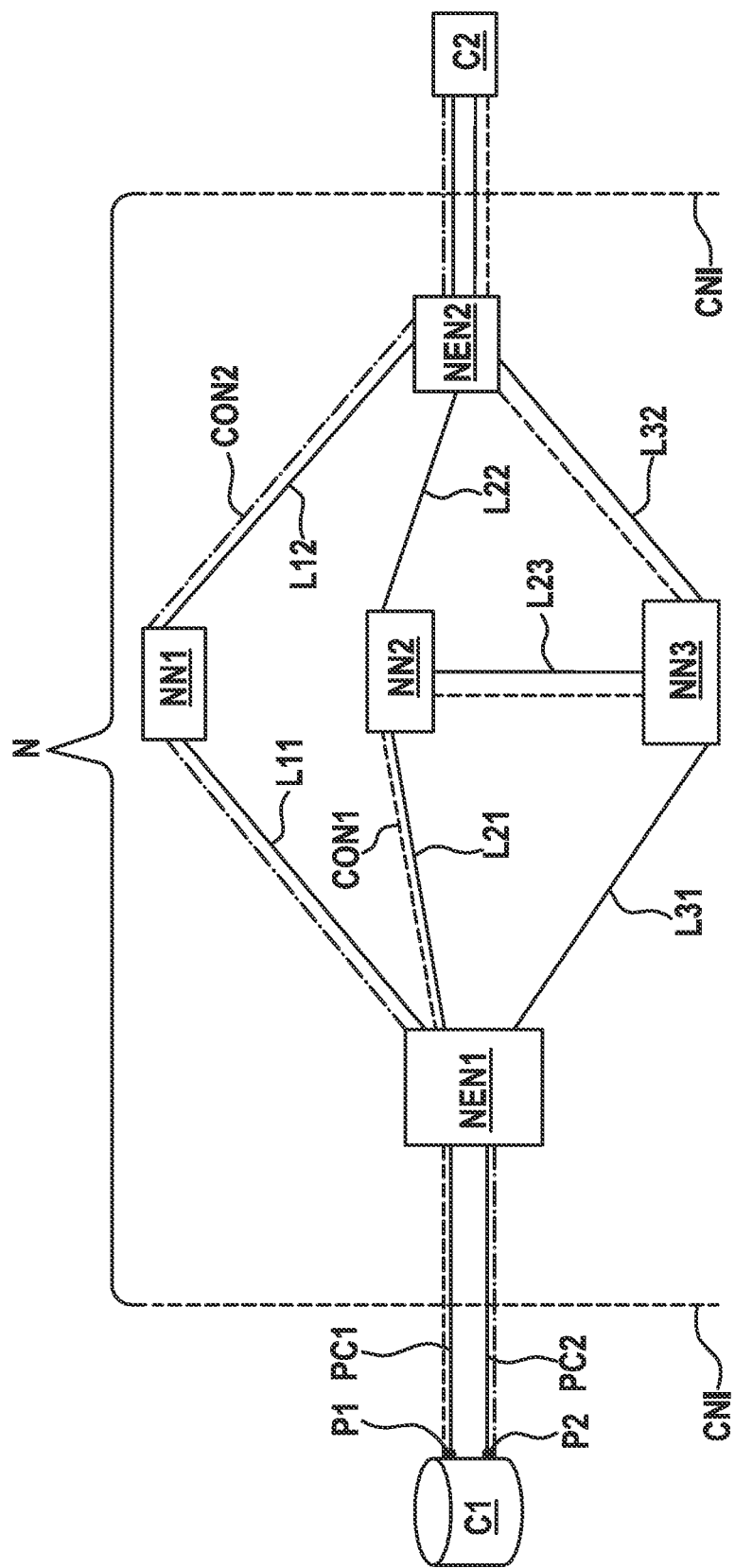
FIG. 1 shows a network, in which a first client device is connected to a single network end point node.

FIG. 1 depicts a network N, to which a first client device C1 is connected via a first port P1 and a second port P2. A first port connection PC1 and a second port connection PC2 lead from the ports P1, P2 of the first client device C1 through a client network interface CNI to a first network end point node NEN1. The first network end point node NEN1 is connected via different links and network nodes to a second network end point node NEN2. The first network end point node NEN1 is connected via a first link L11 to the first network node NN1, from which a second link L12 leads to the second network end point node NEN2. A third link L21 leads from the first network end node NEN1 to a second network node NN2, from which a fourth link L22 leads to second network end node NEN2. A fifth link L23 leads from second network end node NN2 to a third network node NN3. A sixth link L31 connects the first network end node NEN1 and the third network node NN3. A seventh link L32 connects the third network node NN3 with the second network end node NEN2. A second client device C2 is connected via a client network interface CNI to the second network end node NEN2.

The first client device C1 requests via the first port connection PC1 from the first network end point node NEN1 a first data connection to the second client C2. In the case, that the network and the network nodes as well as the network endpoint nodes support the protocol of multi protocol label switching (MPLS), the first network end point node NEN1 is able to determine a first path through the network using the protocol of Open Shortest Path First Traffic Engineering (OSPF-TE). According to the example in FIG. 1, this first path PTH1 leads from the network end point node NEN1 via the link L21 to the network node NN2, followed by the link L23 via the network node NN3 and the link L32 to the network endpoint node NEN2. The used links L21, L23, L32 are path segments of the first path PTH1={L21,L23,L32}. The first data connection CON1 is then established via the first path PTH1 between the client device C1 and the client device C2. The principle of establishing a determined path in a network, in which the network elements support MPLS, is carried out via a communication protocol between the network elements known as RSVP-TE. This protocol is initiated by the network endpoint node NEN1, which requests to establish the first path PTH1 for establishing the first data connection CON1.

In the case, that the client device C1 wishes to establish a second data connection CON2 to the client device C2, it sends a request via the port connection PC2 to the network, which is received by the network endpoint node NEN1. Via the OSPF-TE protocol, the network endpoint node NEN1 is able to determine a second path PTH2 for the second data connection CON2, such that the second path PTH2 is disjoint to the first path PTH1. This means, that the first and the second paths do not use common network resources for data transmission between the network endpoint nodes NEN1, NEN2.

By this, the network endpoint node NEN1 is able to establish a second data connection CON2 via the second path PTH2 as a disjoint data connection to the first data connection CON1. For the purpose of relying on the OSPF-TE protocol, the network endpoint node NEN1 stores routing data RD, which is collected from messages exchanged by the network nodes and network endpoint nodes. From the routing data RD, the network endpoint node NEN1 has information about the topology of the network N, which enables it to choose certain links for determining a path.

The second path PTH2 leads from the network endpoint node NEN1 via the link L11 to the network node NN1, from which it proceeds via the link L12 to the network endpoint node NEN2. These links, used for the second path PTH2, are path segments of the second path PTH2={L11,L12}.

In the case, that the network N depicted in FIG. 1 is a network of the type synchronous digital hierarchy (SDH) or an optical transport network (OTN), the principle of Generalized Multi Protocol Label Switching (GMPLS) can be exploited by the first network endpoint node NEN1 for determining and establishing disjoint data paths for establishing disjoint data connections.

Figure 2:
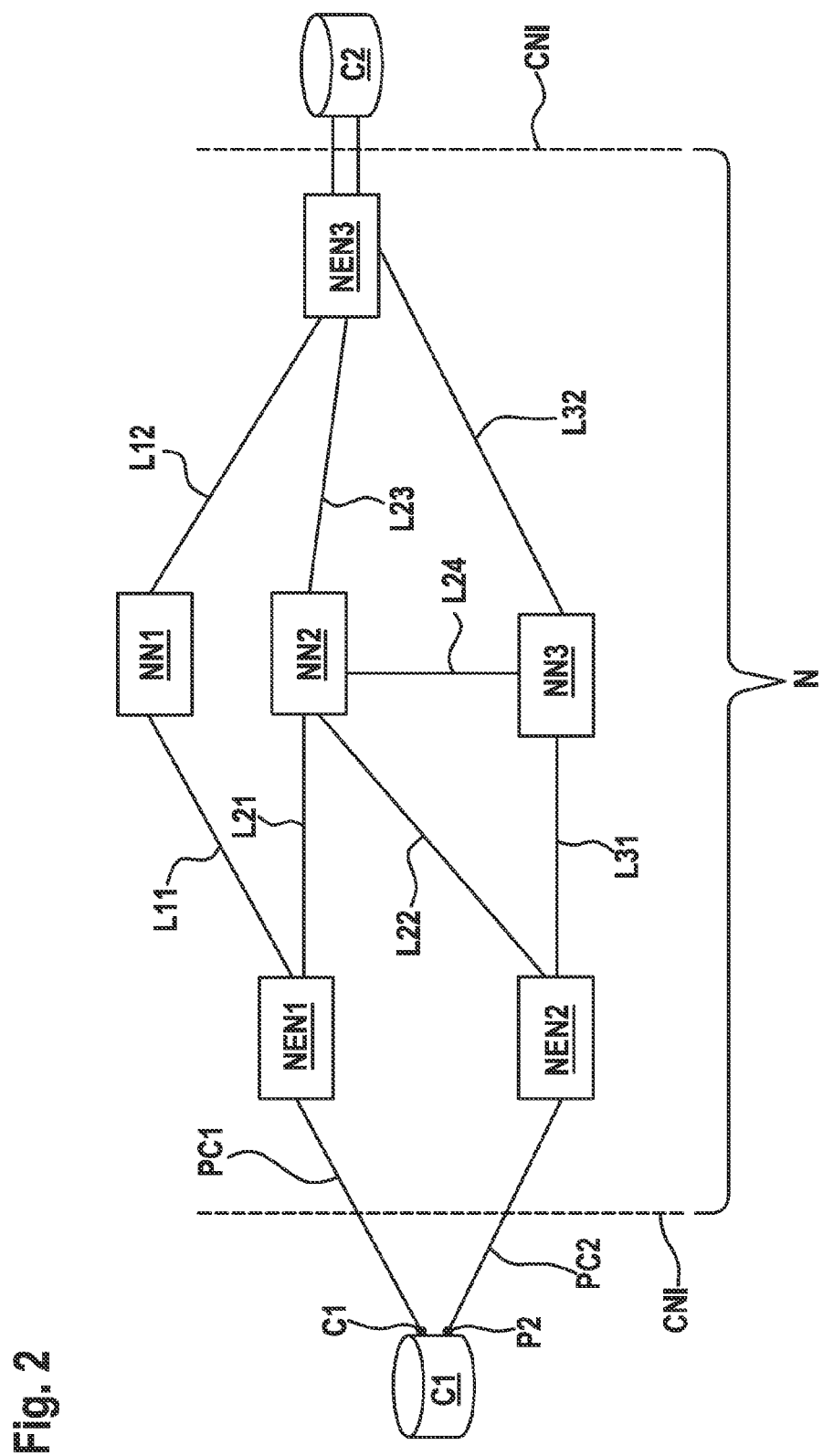
FIG. 2 shows a network, in which a first client device is connected to two network end point nodes.

FIG. 2 depicts a network, in which a first client device C1 is connected via a first port P1 and a first port connection PC1 to a first network endpoint node NEN1. Furthermore, the first client device C1 is connected via a second port P2 and a second port connection PC2 to a second network endpoint node NEN2. The first network endpoint node NEN1 and the second network endpoint node NEN2 are connected via different links and network nodes to a third network endpoint node NEN3, to which a second client C2 is connected through a client network interface CNI.

The network N in FIG. 2 comprises the network endpoint nodes NEN1, NEN2, NEN3 as well as further links and further network nodes. A first link L11 leads from the first network endpoint node NEN1 to a first network node NN1. A second link L12 leads from the first network node NN1 to the first network endpoint node NEN3. A third link L21 leads from the first network endpoint node NEN1 to the second network node NN2. A fourth L23 leads from the second network node NN2 to the third network endpoint node NEN3. A fifth link L22 leads from the second network endpoint node NEN2 to the second network node NN2. A sixth link L24 leads from the second network node NN2 to a third network node NN3. A seventh link L31 leads from the second network endpoint node NEN2 to the third network node NN3. An eight link L32 leads from the third network node NN3 to the third network endpoint node NEN3.

Figure 3:
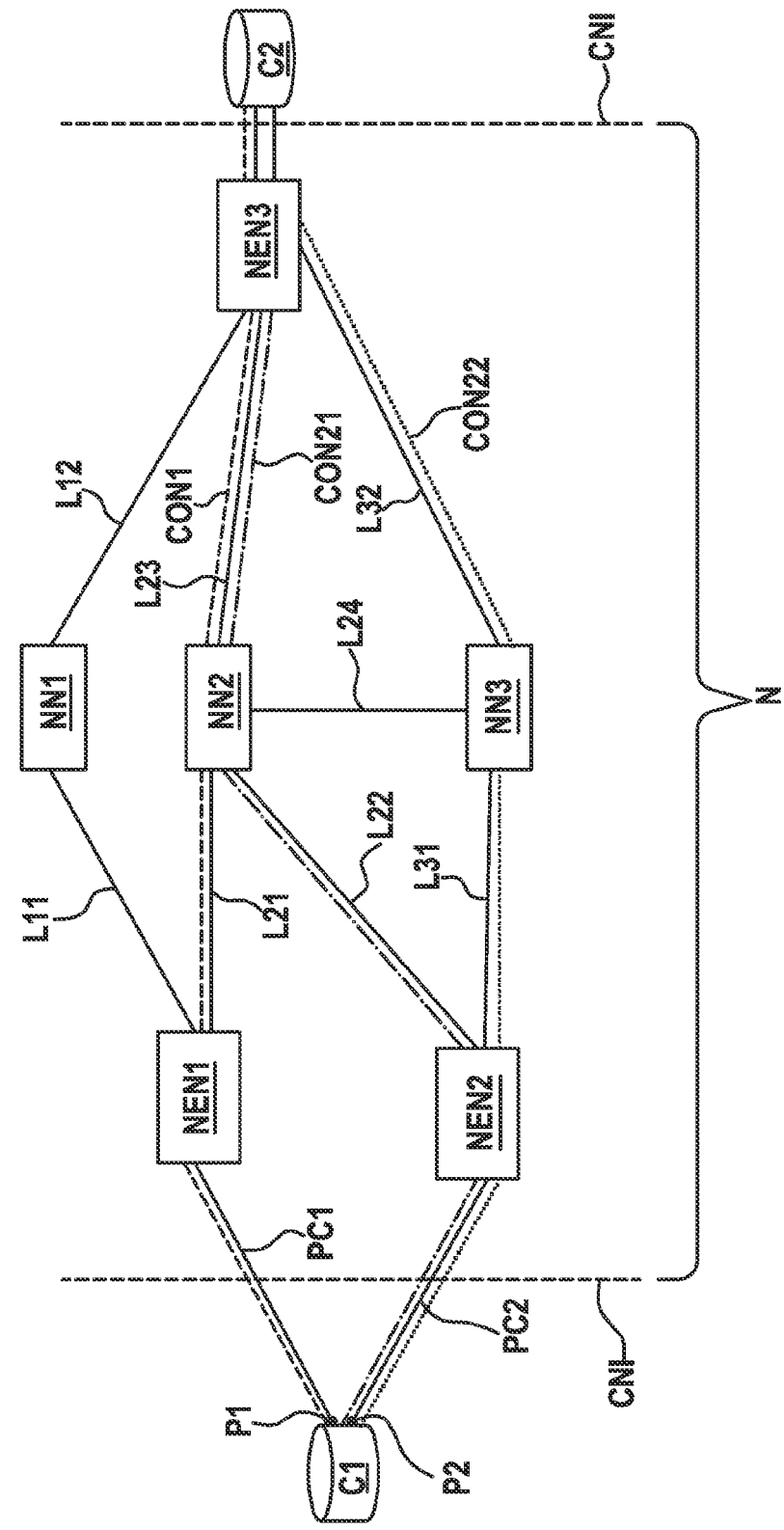
FIG. 3 shows a network, in which the first client device is connected to two network end point nodes and in which data connections are established by the network end point nodes according to the prior art.

FIG. 3 depicts data connections established when using the principle of MPLS or GMPLS for providing data connections to the first client device C1. The network depicted in FIG. 3 depicts all elements depicted in FIG. 2. Furthermore, the network in FIG. 3 depicts a first data connection CON1, a second data connection CON21, and the third data connection CON22. The purpose of these data connections will be explained in detail further below.

It shall be assumed, that the client device C1 requests via the first port connection PC1 from the network endpoint node NEN1 a first data connection to the client device C2. Furthermore, it shall be assumed that the network endpoint node NEN1 determines a path via the link L21 and the link L23, passing the network node NN2, finally arriving at the network endpoint node NEN3.

Such a path may be determined using the OSPF-TE protocol. After establishing the path using the protocol of RSVP-TE, the network endpoint node NEN1 provides the first data connection CON1 via this path to the client device C1 through the first port connection PC1.

As a next step, it shall be assumed that the client device C1 requests via the second port connection PC2 from the network endpoint node NEN2 a second data connection to the client device C2, which shall be disjoint to the first data connection CON1. In the case, that the network endpoint node NEN2 relies on the protocol of OSPF-TE, it has knowledge about the topology of the network N, but it does not have knowledge about the first path being used for the first data connection CON1, which was determined and established by the network endpoint node NEN1. Therefore, the network endpoint node NEN2 does not have sufficient knowledge concerning the question, which kind of network recourses shall be used, in order to establish a second data connection, which shall be disjoint to the first data connection CON1.

As depicted in FIG. 3, the network endpoint node NEN2 may either establish a second data connection CON21 via a path leading from the network endpoint node NEN2 via the link L22 to the network node NN22, proceeding via the link L23 to the network endpoint node NEN3. Such a second path for such a second data connection CON21 would be a second data connection, which is not disjoint to the first data connection CON1. A third data connection CON22 is also possible, which leads via a path from the network endpoint node NEN2 along the link L31 to the network node NN3 and the link L32 to the network endpoint node NEN3. Such a third data connection CON22 would be a data connection which is disjoint to the first data connection CON1.

The problem is, that the second network endpoint node NEN2 is not able to distinguish between the second connection CON21 and the third connection CON22 regarding the disjointness of these connections CON21, CON22 to the first connection CON1. This is due to the fact, that the protocol of OSPF-TE from MPLS or equivalent protocols of GMPLS do not provide sufficient information to the second network endpoint node NEN2 in order to be aware of paths and data connections already established by a different node, such as the first data connection CON1 established by the network endpoint node NEN1. For establishing a data connection, which shall be disjoint to a data connection established earlier by a different network endpoint node, a network endpoint node is according to the prior art not able to take into account the paths and data connections already established by other network endpoint nodes.

Passing on complete topology information of the network N to the client device C1 would on the one hand make it possible for the client device C1 to choose certain network resources of the network N for establishing data path and corresponding data connections as desired. This would on the other hand have the disadvantage, that complete topology information of the network N would be passed on to a client C1. This is often not desirable for network operators for matters of security.

First Embodiment

A network operator assigns network resources to disjoint sets of network resources, such that disjoint data connections relying on disjoint sets lead through the network from a first client device C1 to a second client device C2. Each set of network resources is disjoint to each other, meaning that one single network resource can only belong to one single set of network resources.

In other words: a set of network resources is made up such, that it is possible to establish a data connection, relying only on network resources of a single set of network resources, between a first client device and a second client device through the network. Furthermore, data connections relying on different disjoint sets of network resources have no network resource in common. The network resources are uniquely designated to a set by the network operator. This means, that a single network resource can only be assigned to one single set of network resources. A set of network resources may comprise a single or multiple network resources. The network furthermore creates indication data for uniquely identifying a single set of network resources and provides this indicating data to the first client. According to a preferred solution, an indicating data is a single data value, whereby such a value may be a number or another value, uniquely identifying a set of network resources. Thus, from the perspective of the first client, the indicating data is predefined data.

For assigning a network resource to a set of network resources, the network operator may assign a tag to the network resource, wherein the tag uniquely identifies the set of network resources. The indicating data for uniquely identifying a set of network resources may then be the tag that has been assigned to all network resources belonging to the identified set of network resources. Furthermore, the network operator may create designating data, which designates network resources to disjoint sets of network resources. The designating data may comprise data for identifying the network resources and the tags, that were assigned to the network resources for the purpose of assigning the network resources to disjoint sets. This designating data is then provided by the network operator to network endpoint nodes, to which clients may be connected. The designating data may be provided to further network devices.

In this first embodiment, a link is assumed to be a network resource. Network nodes are not assumed to be a network resource.

Figure 4:
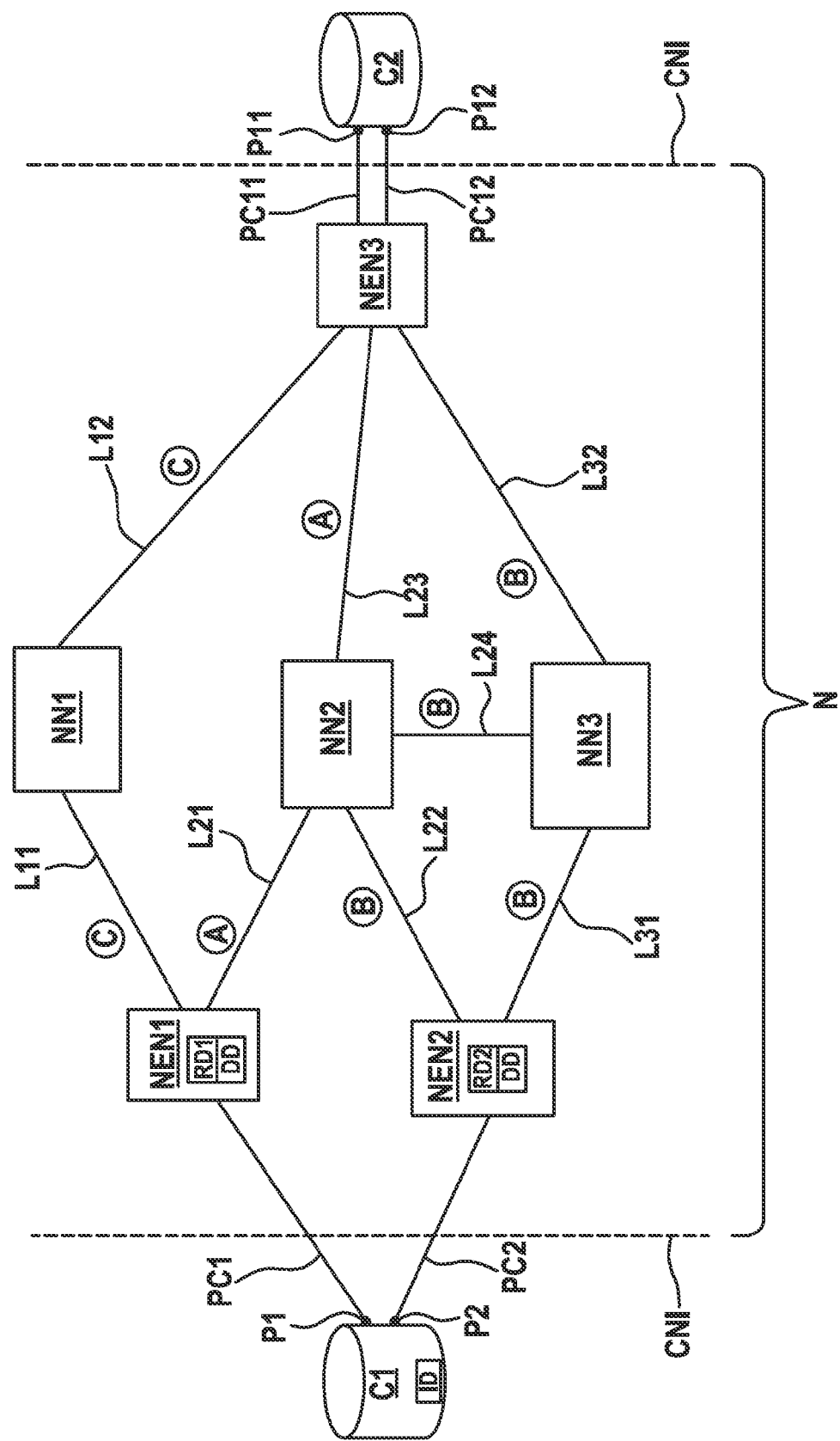
FIG. 4 shows a network for which network resources are assigned to disjoint sets of network resources according to a first embodiment.

FIG. 4 depicts a network N and two client devices with all elements depicted in FIG. 2. Furthermore, FIG. 4 illustrates additional elements, by which the proposed method of establishing disjoint data connections will be explained now on according to a first embodiment.

According to FIG. 4, a first set of network resources SA is made up of the link L21 and the link L23 SA={L21,L23}. This is illustrated in FIG. 4 by assigning a tag A to the third L21 and the link L23. A second set of network resources SB, which is disjoint to the first set of network resources SA, is made up as SB={L22,L24,L31,L32}. The network resources of the second set SB are assigned a second tag B in FIG. 4. A third set of network resources SC, which is disjoint to the first set SA and the second set SB, is made up as SC={L11,L12}. The network resources of the third set SC are assigned a third tag C. The tags A, B, C are defined as being indicating data ID, which is provided to the client C1. Furthermore, the designating data created by the network operator is provided to the network endpoint nodes NEN1, NEN2, where it is stored. Once a network operator of a network N has assigned network resources to sets of network resources and has also assigned tags A, B, C to network resources, the resulting designation data can be distributed via protocols through a network for the purpose of making the designation data available to all elements of the network.

The indicating data DD stored at the first client device C1 may simply be the tags A, B, C, which uniquely identify the sets of network resources as SA, SB, SC.

If the client C1 wishes to establish a data connection based on network resources belonging to a certain set network resources, the client simply has to choose the corresponding tag from the indicating data ID and send a request, including the address of the remote client C2 and the chosen tag, to the network endpoint node NEN1. The network end node NEN1 then establishes a first data connection to the remote client C2 based on network resources belonging to the set identified by the chosen tag. Assuming proper designation of network resources to disjoint sets by the network operator, the client device C1 is able to request a further, disjoint data connection from the network endpoint node NEN2, by choosing a different tag from the indicating data ID for a further data connection, and send a request, including the address of the remote client C2 and the further chosen tag, to the network endpoint node NEN2. The network end node NEN2 then establishes a further data connection to the remote client C2 based on network resources belonging to the set identified by the further chosen tag. This leads to data connections which are disjoint to each other and which have been provided by different network end nodes NEN1, NEN2.

For establishing a data connection using only on resources of an identified set of network resources, a network end node relies on the designating data DD stored in the network end node and on routing data also stored in the network end node. The routing data may for example be routing data used for MPLS algorithms or GMPLS algorithms.

The client C1 may send individual request messages with individual indicating data to individual network end nodes for requesting individual disjoint data connections. The client C1 may also send one request message carrying multiple indicating data for requesting multiple disjoint data connections.

The different steps of the proposed method for establishing disjoint data connections will now be explained in detail using FIG. 5A and FIG. 5B.

Figure 5A:
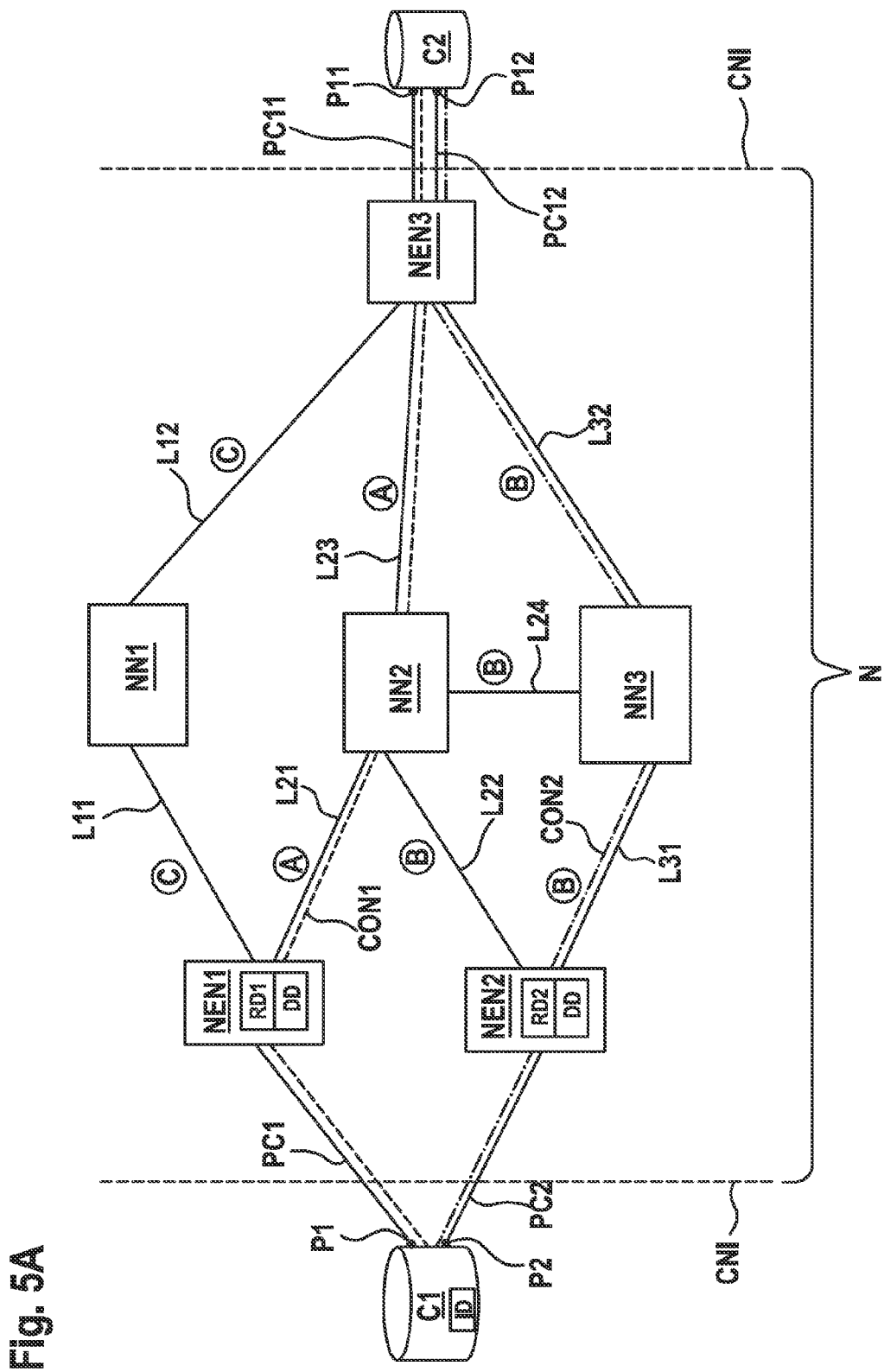
FIG. 5A shows a network with established disjoint data connections.

FIG. 5A depicts the same network with all elements as depicted in FIG. 4. Furthermore, FIG. 5A depicts a first data connection CON1 and a second data connection CON2 established according to the proposed method. FIG. 5B depicts different steps of a signalling protocol between a client device and a network.

Figure 5B:
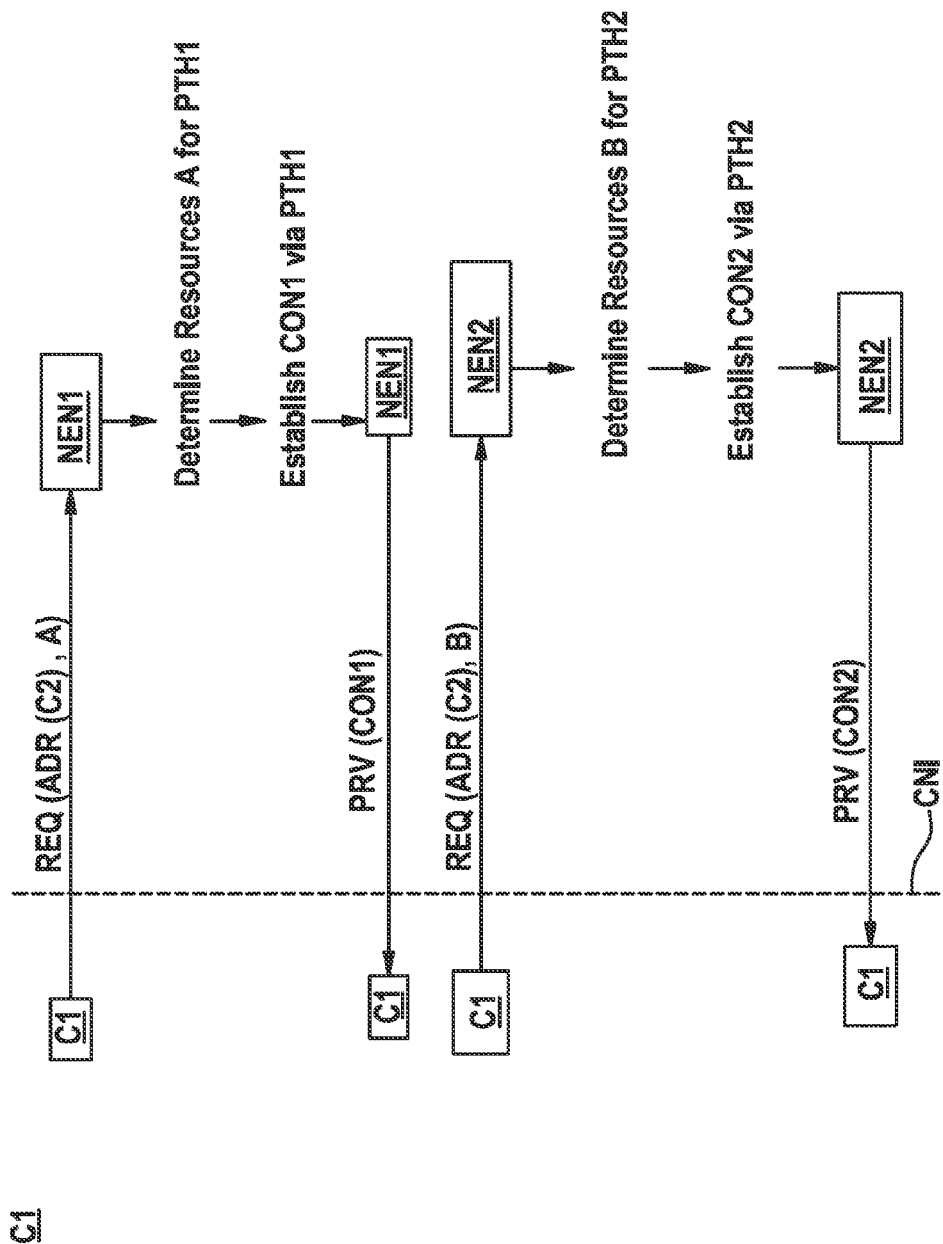
FIG. 5B shows steps of a protocol for establishing disjoint data connections according to the first embodiment.

According to FIG. 5B, the first client device C1 sends a request message REQ via its first port P1 to the network endpoint node NEN1. The request message REQ is a request for a data connection to the client device C2 via network resources of the first set of network resources SA. Therefore, the request message REQ contains the address of the second client ADR2 (C2) and the indicating data identifying the first set of network resources, which is the tag A. As a next step, the network endpoint node NEN1 determines a first path PTH1 composed of only network resources of the first set SA. As a further step, the network endpoint node NEN1 establishes the first path PTH1 and by this establishes the first data connection CON1 via the first path PTH1. The network endpoint node provides the established first data connection CON1 to the client device C1 via the client network interface CNI by sending a providing message PRV(CON1).

According to FIG. 5A, the first path PTH1 is determined as PTH1={L21,L23}. The first data connection CON1 established via the first data path PTH1 is depicted as a dashed line in FIG. 5A. As depicted in FIG. 5B, the first data connection CON1 is provided to the first client device C1 via the client network interface CNI.

As a next step, FIG. 5B depicts a second request REQ by the client device C1 to the network endpoint node NEN2. This second request is a request for a second data connection leading from the client device C1 to the client device C2. The second data connection CON2 shall be disjoint to the first data connection CON1. This request for a disjoint data connection is made by the client device C1, by including into the second request message not only the address of the second client device ADR (C2), but also a tag B as a indicating data, which uniquely identifies the second set SB of network resources, which is disjoint to the first set SA of network resources. Upon receiving this request, the second network NEN2 determines a second path PTH2, which is based only on network resources of the second set SB as the path PTH2={L31,L32}. The second network endpoint node NEN2 establishes the second path PTH2 and thus also establishes the second data connection CON2, which is disjoint to the first data connection CON1. The network endpoint node NEN2 provides the second data connection CON2 via the client network interface CNI to the client device C1. By receiving the second request message including the tag B as indicating data, the network endpoint node NEN2 is able to rely on the designation data DD stored in the network endpoint node NEN2 for the purpose of being sure to determine a second data connection CON2, which is disjoint to the first data connection CON1. The indicating data B uniquely identifies those network resources, which are marked in the designating data DD as having the tag B as well and therefore belonging to the second set SB of network resources.

The proposed method has the advantage, that the network endpoint node NEN2 is able to provide a second data connection CON2 disjoint to the first data connection CON1, which was provided by the network endpoint node NEN1. In other words, different network endpoint nodes NEN1, NEN2 are able to provide data connections, which are disjoint to other data connections, established earlier by other network endpoint nodes. This is ensured by the designation data DD stored in the network endpoint nodes and the indicating data ID stored in the first client device C1. No complete topology information has to be passed on to the first client device C1. This ensures a high level of security for a network provider of the network N.

As previously explained in relation to FIG. 3, it is according to the prior art not possible to ensure, that the second network endpoint node NEN2 provides a second data connection, which shall be disjoint to a first data connection CON1 established earlier by the first network endpoint node NEN1. This problem is now solved by carrying out the different steps of the proposed method as described above.

According to the first embodiment, the indicating data ID includes the tags A, B, C which were provided by the network operator. According to a first alternative solution, the indicating data ID stored in the first client device C1, contains furthermore along with each individual tag A, B, C a data identifying the port P1, P2 through which a network endpoint node can be reached, which is able to establish a data connection corresponding to a certain chosen tag. Looking at FIG. 5A, first indicating data would contain the first tag A along with data identifying the first port P1. This is due to the fact, that via the first port P1 the first network endpoint node NEN1 can be reached, which is that network endpoint node being able to establish a data connection via the first set of network resources SA corresponding to the first tag A. Second indicating data is in this solution the tag B along with the identification data identifying the second port P2. Third indicating data would be the third tag C along with the identification data identifying the first port P1. By storing a certain tag as indicating data along with a certain identification data identifying a certain port, the client device C1 has knowledge through which port P1, P2 it is possible to successfully request a data connection using network resources from a set of network resources corresponding to the chosen tag.

Figure 5C:
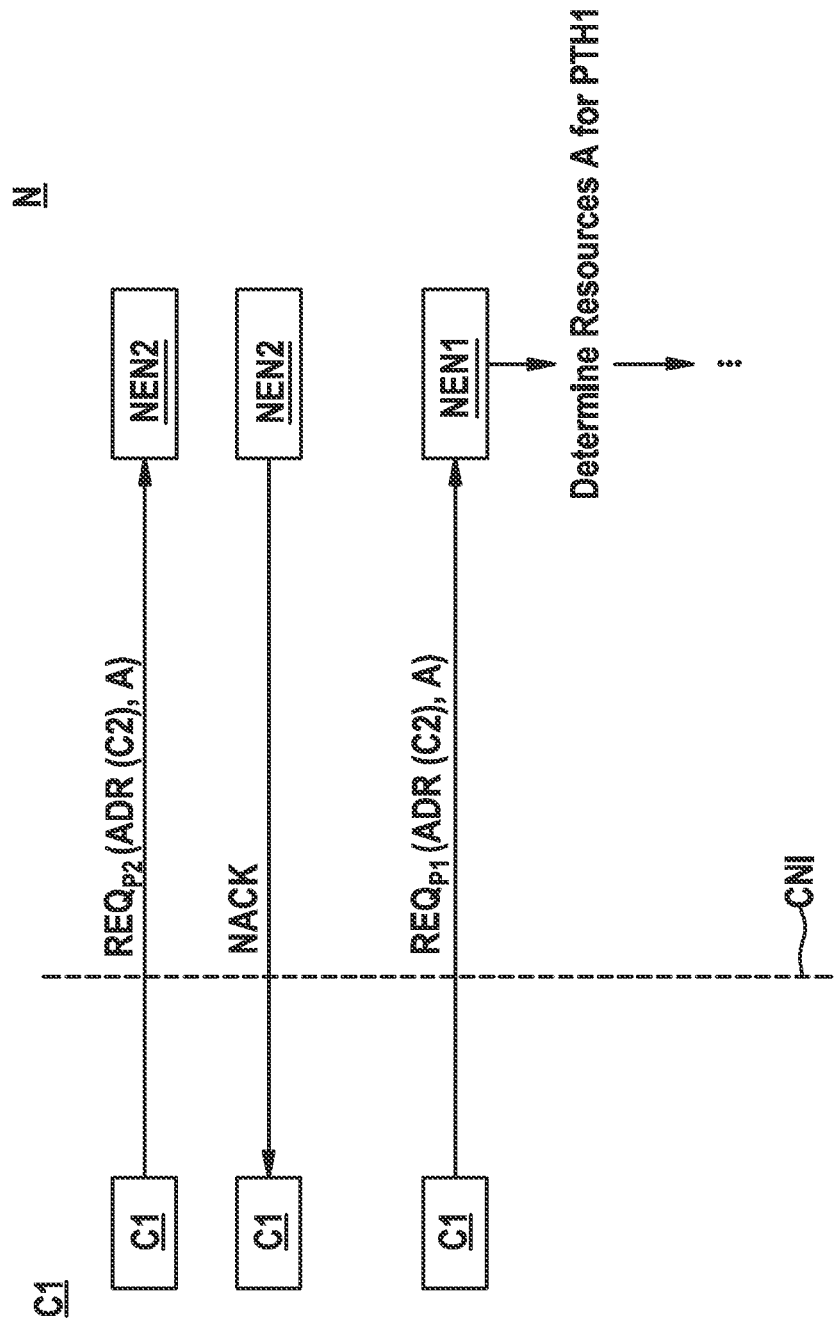
FIG. 5C shows steps of an alternative protocol for establishing disjoint data connections according to the first embodiment.

According to a further alternative solution, only indicating data A, B, C is stored as the indicating data ID in the first client device C1. No identification data identifying a certain port P1, P2 is stored along with the indicating data ID. For this alternative solution, FIG. 5C depicts a protocol for signalling between the client device C1 and network endpoint node NEN1, NEN2. The client device C1 sends a request REQ via the second port P2 to the second network endpoint node NEN2, requesting a data connection to the client device C2 using network resources with the tag A belonging to the first set of network resources SA. Since the network endpoint node NEN2 is not able to establish a data connection using only network resources of the second set of network resources SB, it sends a message of not acknowledging this request via the client network interface CNI to the first client device C1, which is depicted as a message NACK. By this message NACK, the client device C1 is informed, that the request was made at a port P2, through which it is in general not possible to comply with the request. Thus, the client device C1 is informed, that it has to try to request the initially requested data connection through a different port. Therefore, the same request is made again, but this time through the first port P1 to the first network endpoint node NEN1. Since the first network endpoint node NEN1 is able to comply with this request, it continuous with the different steps of the protocol of determining and establishing a path PTH and a data connection CON as already depicted in FIG. 5B and described in detail above.

Figure 6A:
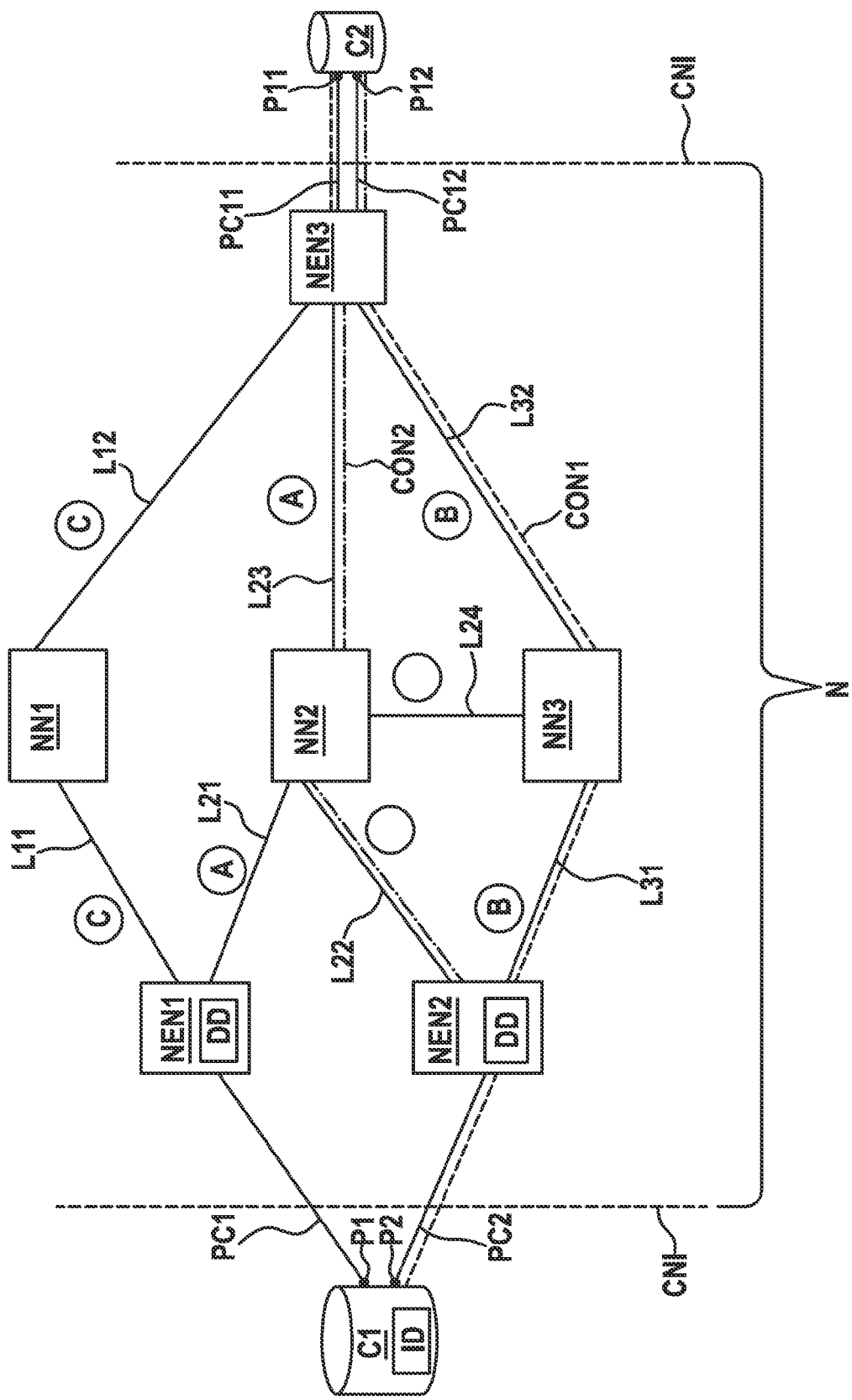
FIG. 6A shows a network with established data connections according to a further alternative solution.

FIG. 6A depicts an alternative solution of establishing disjoint data connections along with steps of a signalling protocol of this solution illustrated in FIG. 6B.

FIG. 6A depicts the same network with all elements, as depicted in FIG. 4, except for one difference. This difference is that the link L22 and the link L24 are not designated to the second set of network resources SB. Therefore, the link L22 and the link L24 do not carry a tag and the second set of network resources SB is SB={L31,L32}. According to FIG. 6A, the indicating data ID stored at the client device C1 contains only the tags A, B, C. The client device C1 has no knowledge about the fact, through which port P1, P2 a data connection via a data path based on network resources of a certain set of network resources can successfully be requested from a network endpoint node NEN1, NEN2.

According to FIG. 6B, the client device C1 sends a request message to the network endpoint node NEN2, requesting a data connection to the client device C2 based on network resources belonging to the second set of network resources SB. The network endpoint node NEN2 determines upon this request the first path PTH1 as the path PTH1={L31,L32}, and establishes the first data connection CON1 via the first path PTH1. The first data connection CON1 is then provided via the client network interface CNI to the client device C1 by the network endpoint node NEN2. As a second request, the client device C1 requests a second data connection to the client device C2 via the second port P2 from the second network endpoint node NEN2, which shall be based on network resources belonging only to the first set network resources SA. As depicted in FIG. 6A, the network endpoint node NEN2 is not able to determine a path PTH2, which uses only network resources belonging to the first set of network resources SA. But, the network endpoint node NEN2 is able to determine a path PTH2 as PTH2={L22,L23}, which contains network resources belonging to the first set of network resources SA, which is the link L23, as well as a network resource, the link L22, which is not assigned to any other set of network resources and is not yet occupied for a data path of a data connection previously determined and established. Instead of rejecting the second request of the client device C1, the network endpoint node NEN2 establishes the second data connection CON2 as PTH2={L22,L23}, since this data connection is a data connection disjoint to the previously established data connection CON1. This second data connection CON2 relies on network resources of the demanded set of network resources SA and network resources not assigned to a set of network resources and not yet used for an established data connection established at a previous time instance.

According to the signalling protocol in FIG. 6B, the path PTH2={L22,L23} is determined and established by the network endpoint node NEN2, which by this establishes the second data connection CON2 depicted as a dash-dotted line. The second data connection CON2 is provided by the network endpoint node NEN2 to the client device C1 through the client network interface PRV (CON2). Additionally, an indication message MSG is sent by the network endpoint node NEN2 to the client device C1 through the client network interface CNI. This message MSG contains indication data, indicating that the provided second network connection CON2 is disjoint to other data connections, but relies on network resources not belonging to the demanded set of network resources SA, as well as network resources belonging to the demanded set of network resources SA.

Figure 7:
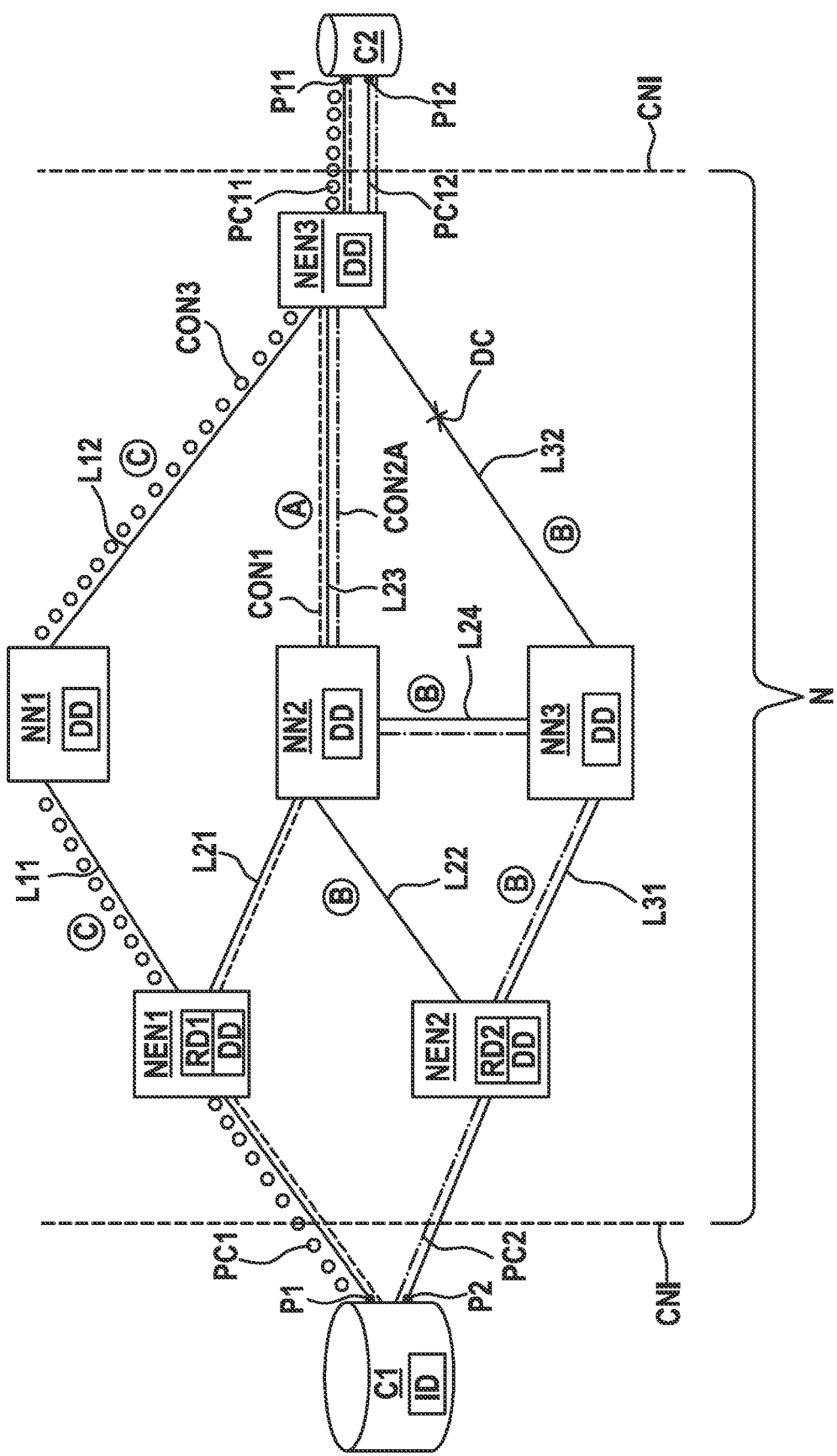
FIG. 7 shows a network with established data connections and a changed data path according to the first embodiment.

FIG. 7 depicts an alternative solution of establishing data connections in a network, in the case of a failure of a network resource. FIG. 7 depicts all elements as depicted in FIG. 4. Furthermore, FIG. 7 depicts a first data connection CON1 provided by the first network end point NEN1 through the first port P1 to the first client device C1. The first data connection CON1 relies on a first data path PTH1={L21,L23}. Furthermore, FIG. 7 depicts a third data connection CON3 provided by the first network endpoint node NEN1 through the first port P1 of the client device C1. The third data connection CON3 relies on a third data path PTH3 formed by links of the third set of network resources SC, leading to the third data path PTH3 as PTH3={L11,L12}.

According to FIG. 7, the link L32, carrying the second tag B and thus belonging to the second set of network resources SB, has a disconnection failure DC. Thus, the network is no more able to provide a second data transmission CON2, as depicted in FIG. 5A, relying on the path PTH2={L31,L32}. Instead, the network has to change the second data connection CON2 to a changed second data connection CON2A, which relies on a changed second data path PTH2A as PTH2A={L31,L24,L23}. The changed second data connection CON2A via the changed second data path PTH2A now relies partially on a further network resource contained in the first set of network resources SA, which is the link L23. Thus, the second changed data connection CON2A is not disjoint anymore to the first data connection CON1.

As a first alternative, the second network endpoint node NEN2 signals an indication message to the client device C1 in the case, that the second data connection CON2 is changed, but the changed second data connection CON2A is still disjoint to all other previously established data connections. Such a message contains preferably the tag B of the network resources which identifies the set of network resources SB, which was used for establishing the data connection.

As a second alternative, the network endpoint node NEN2 signals an indication message to the first client device C1 in the case, that the second data connection CON2 is changed to a changed second data connection CON2A, such that the changed second data connection CON2A is not disjoint anymore to all other previously established data connections, but has at least one further network resource in common with a previously established data connection, wherein the further network resource is of the set of network resources of the previously established data connection. The message preferably contains the second label B of the changed second data connection CON2A. As an alternative solution, this message contains furthermore the label A of the data connection CON1, with which the changed data connection CON2A has a resource in common. By this, the client C1 is informed, which data connections are using common resources.

According to the example in FIG. 7, the client device C1 is informed by such a message about the fact, that traffic going along the first data connection CON1 and the changed second data connection CON2A is not going over disjoint resources and disjoint data paths anymore. Thus, the client device C1 is informed about a possible risk of failure for both data connections CON1, CON2A, since they are using a common network resource. In the case of a failure of the link L23, both the first data connection CON1 as well as the changed second data connection CON2A would instantly fail. Therefore, the above described message containing the above described information enables the client device C1 to decide, whether certain data shall be transmitted via the third data connection CON3, which is still disjoint to the first data connection CON1 and the change data connection CON2A.

Preferably, the indication message contains indication data, indicating the type of network resource, which the two data connections CON1, CON2A now have in common after the change.

Second Embodiment

Figure 8:
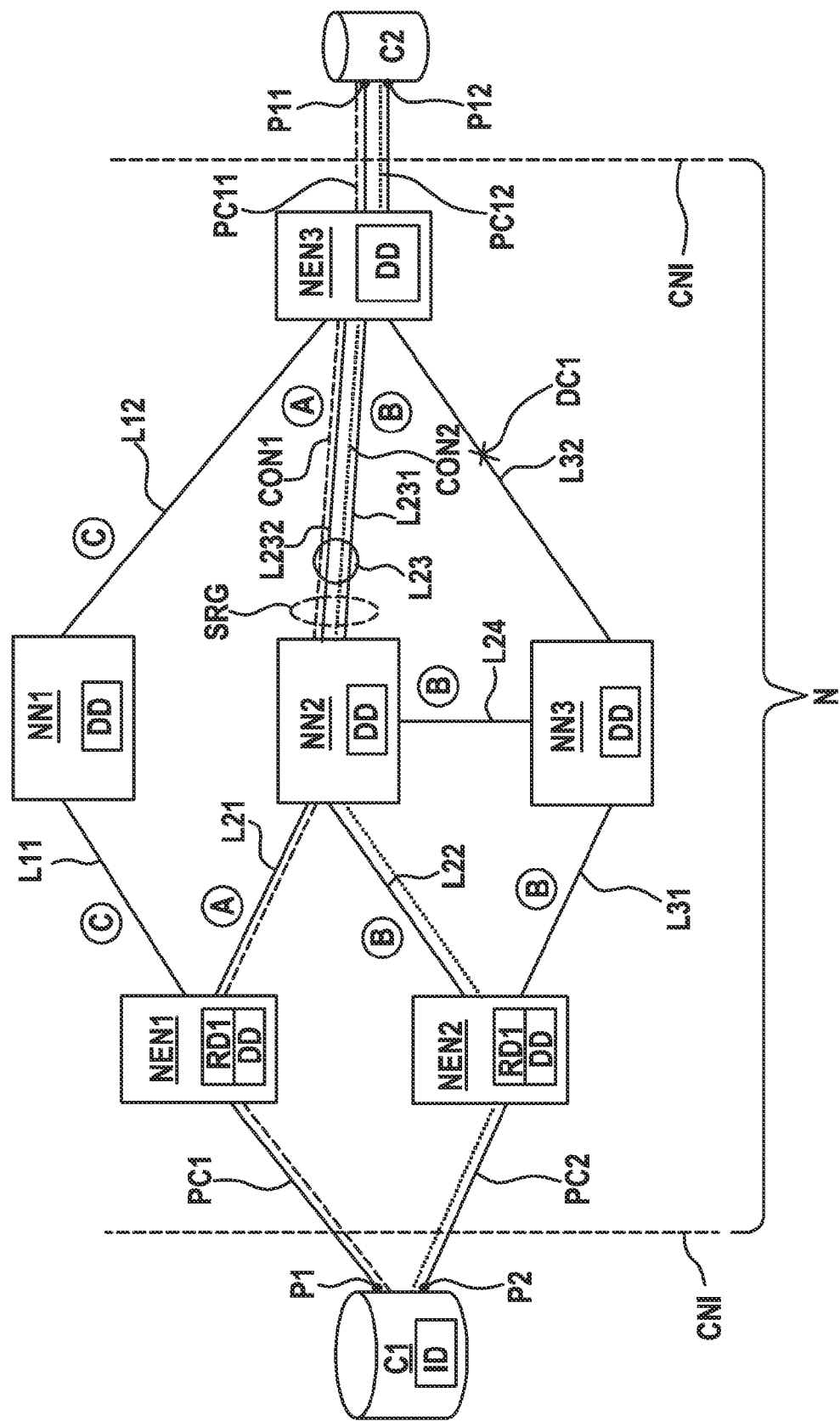
FIG. 8 shows a network with established data connections according to a second embodiment.

FIG. 8 depicts two client devices and the network containing all elements as depicted in FIG. 4 except for one difference. According to FIG. 8, this difference is, that the link L23 is an optical fibre bundle made up of two fibres, a first fibre L231 and a second fibre L232. The first fibre L231 is assigned a second tag B, designating the first fibre L231 to the second set of network resources SB, leading to SB={L22,L231,L31, L24,L33}. The second fibre L232 is assigned a first tag A, designating the second fibre L232 to the first set of network resources SA leading to SA={L21,L232}.

The first data connection CON1 is provided by the first network endpoint node NEN1 through the first port P1 of the client device C1 via a first data path PTH1={L21,L23}. A second data connection CON2 is provided by the network endpoint node NEN2 through the second port P2 to the client device C1 via a second path PTH2={L22,L231}. In this embodiment, the first data connection CON1 and the second data connection CON2 are defined to be disjoint, since they are using different fibres L231, L232 of one optical fibre bundle L23. The tags A, B, C are distributed by the network operator of the network N not only in granularity of single links, but in granularity of single fibres L231, L232 of single fibre bundles. The further links depicted in FIG. 8 are in this example considered to be either optical links of a single fibre only, or to be links of an electrical data connection via a wire.

According to the depicted example, the link L32 suffers from a first disconnection DC1, which is the reason, why the second data connection CON2 is routed along the second path PTH2={L22,L231}, leading to the first connection CON1 and the second connection CON2 going through the same optical fibre bundle L23, but different fibres L231, L232. According to an alternative solution, the two data connections CON1, CON2 are still defined as being disjoint to each other, but the fact, that they are running through different fibres L231, L232 of the same optical fibre bundle L23 is seen as an increased risk, since the two fibres L231, L232 are of a shared risk group SRG. Preferably, the network endpoint node NEN2 signals a message to the client device C1, indicating that the second data connection CON2 now relies on a network resource, which is within a shared risk group SRG of another network resource L232 of another data connection CON1. Preferably, also the network endpoint node NEN1 signals a corresponding message to the client device C1 concerning the first data connection CON1.

Figure 9:
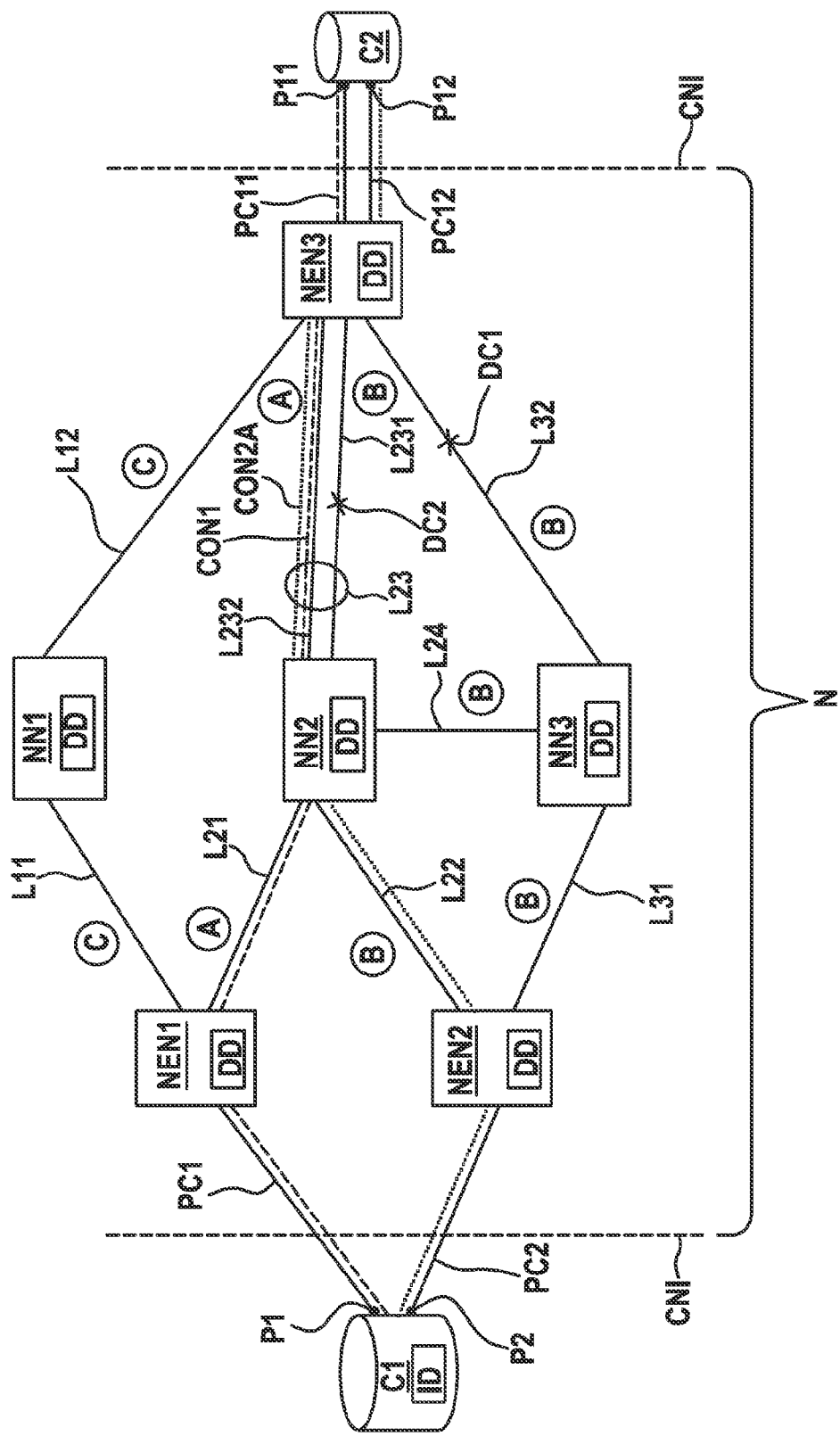
FIG. 9 shows a network with established data connections and a changed data path according to the second embodiment.

Assuming the network depicted in FIG. 8, the network depicted in FIG. 9 illustrates the change of the second data connection CON2 to a change second data connection CON2A in the case of a second disconnection failure DC2 along the first fibre L231 of the fibre bundle L23. The second data path PTH2 is changed, such that it is replaced by the changed second data path PTH2A={L22,L232} leading to the second data connection CON2A depicted as a doted line. Since the first data connection CON1 and the second changed data connection CON2A now relying on the same fibre of an optical fibre bundle L23, these two data connections are defined as being not disjoint anymore to each other. Thus, the second network endpoint node NEN2 signals a message to the client device C1, containing the second tag B of the second data connection CON2, which was changed to a second data connection CON2A not being disjoint anymore to another data connection CON1. Preferably, this message contains additionally the first tag A of the further data connection CON1, with which the second change data connection CON2A now has a network resource of the first set of network resources in common.

Third Embodiment

Figure 10:
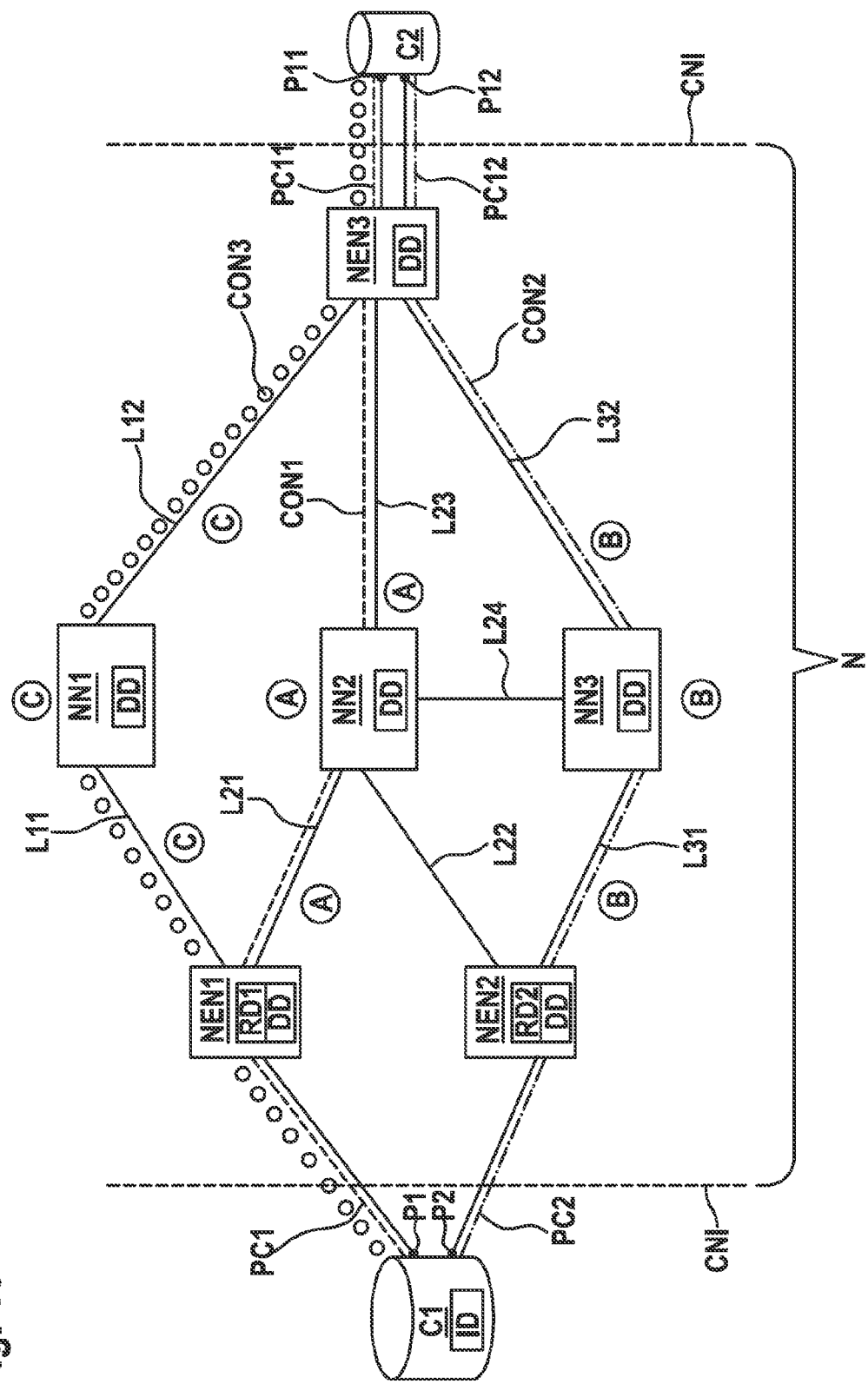
FIG. 10 shows a network with established data connections according to a third embodiment.

FIG. 10 depicts all elements depicted in FIG. 4 except for two differences. The first difference is, that the link L22 and the link L24 do not have tags assigned to them and are thus not designated to any set of network resources.

The second difference is, that not only links have tags assigned to them and are thus designated to sets of network resources, but also network nodes have tags assigned to them and are thus designated to sets of network resources. The network node NN1 has a third tag C assigned and is thus designated to the third set of network resources SC leading to SC={NN1,L11,L12}. The network node NN2 has a first tag A assigned and is thus designated to the first set of network resources SA leading to SA={NN2,L21,L23}. The network node NN3 has a second tag B assigned and is thus designated to a second set of network resources SB leading to SB={NN3, L31,L32}.

A first data connection CON1 is provided by the network endpoint node NEN1 via the first port P1 of the client device C1 based on the first determined and established path PTH1 as PTH1={L21,NN2,L23}. A second data connection is provided by the network endpoint node NEN2 via the second port P2 of the client device C1 based on the second established and determined path PTH2 as PTH2={L31,NN3,L32}. A third data connection CON3 is provided by the network endpoint node NEN1 through the first port of the client device C1 based on the third determined and established path PTH3 as PTH3={L11,NN1,L12}.

Figure 11:
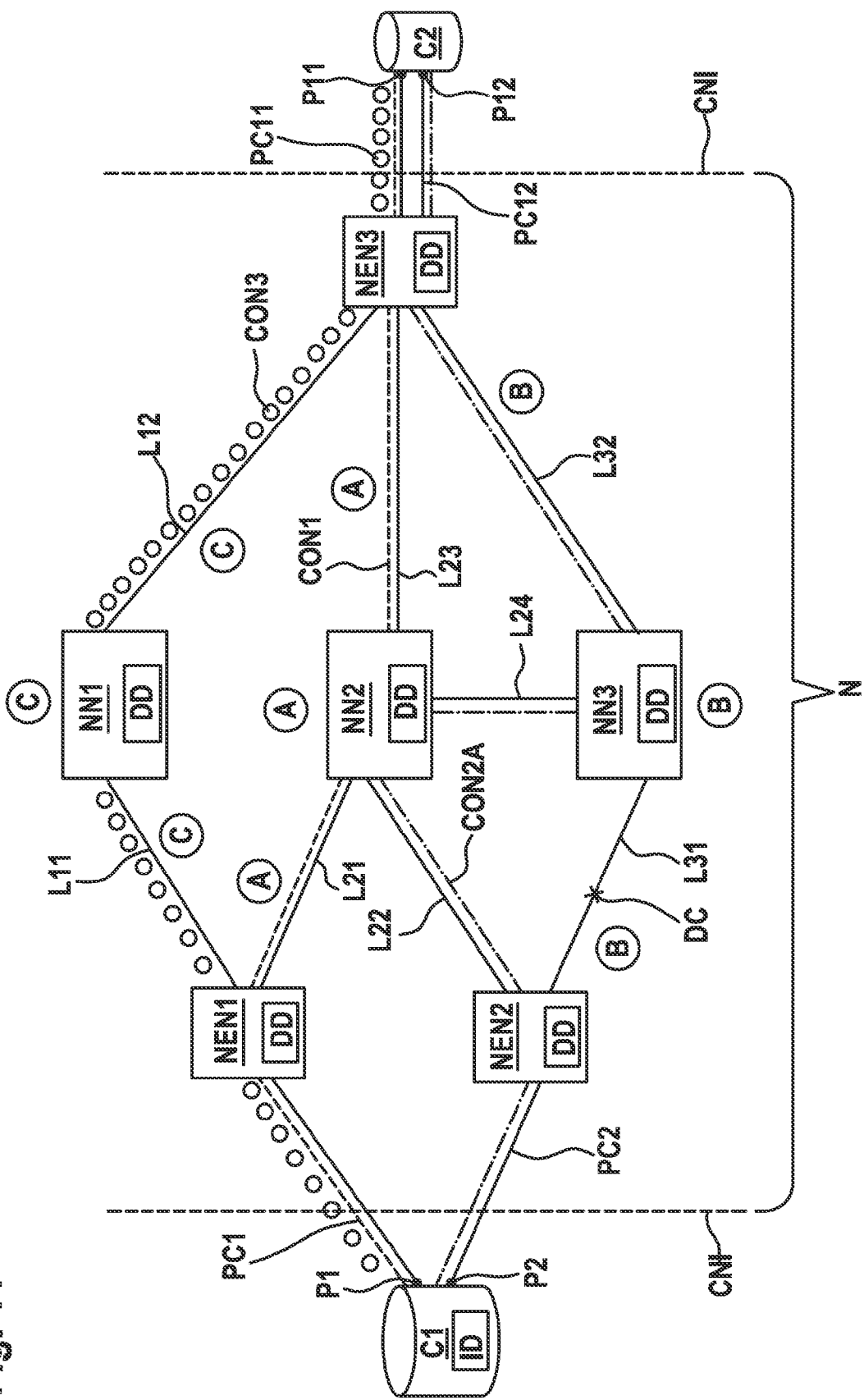
FIG. 11 shows a network with established data connections and a changed data path according to the third embodiment.

Assuming the network depicted in FIG. 10, the network depicted in FIG. 11 illustrates the behaviour of the network in the case, that the link L31 encounters a disconnection failure DC. The second data connection CON2 is changed to a changed second data connection CON2A leading along the changed data path PTH2A as PTH2A={L22,NN2,L24,NN3, L23}. The changed second data connection CON2A still leads only through links, which are either of the second set of network resources SB or other links, which are not contained in any other set of network resources which are the link L22 and the link L24. Speaking in terms of link disjointness, the first data connection CON1 and the second change data connection CON2 are still disjoint to each other. But speaking in terms of network node disjointness, this second data connection CON2 is not disjoint to the first data connection CON1 anymore, since both data connections are now using the second network node NN2, which is designated to the first set of network resources SA. Thus, the second changed data connection CON2A and the first data connection CON1 are defined to be not disjoint to each other anymore. Therefore, the network end point node NEN2 signals a message via the second port P2 to the client device C1. This message contains indication data, indicating that the second data connection CON2 was changed. Furthermore, the message contains preferably indication data, indicating to the client device C1, that the changed second data connection CON2A is not disjoint anymore to all other data connections CON1, CON3 provided to the client device C1 by the network N. Preferably, the message contains additionally indication data, indicating the type of data connection, with which the changed data connection now has a network resource in common. Such indication data may be the tag A of the data connection CON1 with which the changed data connection CON2A is using a network resource in common.

Embodiment of a Network Endpoint Device

Figure 12:
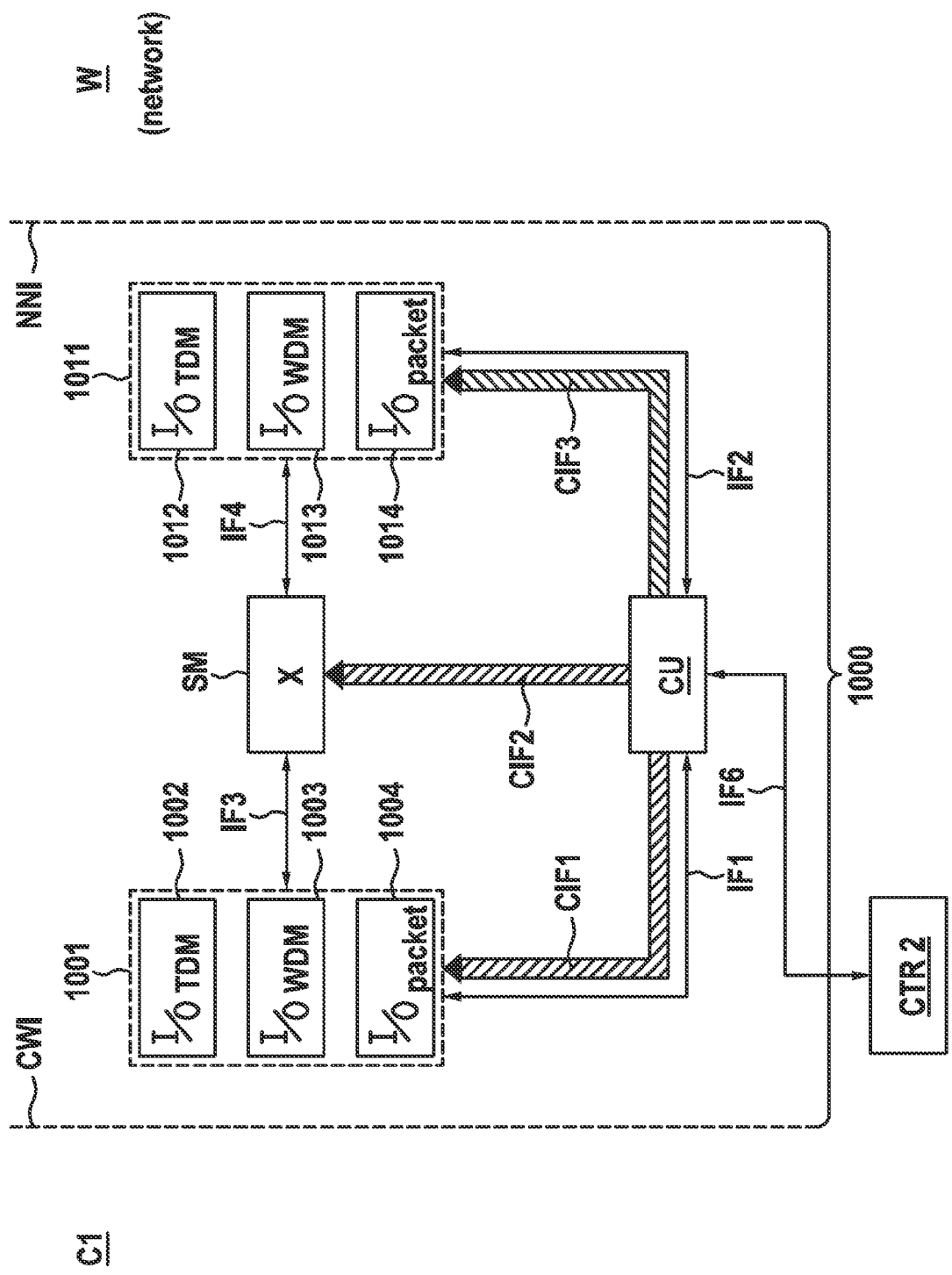
FIG. 12 shows a block diagram of a network end point node.

An embodiment of a network endpoint device which can be used as a network endpoint node in any of the above embodiments is shown in FIG. 12.

The network endpoint device 1000 comprises first interface means 1001 for data transmission with a client device C1 via a client network interface CNI. If the data transmission between the network endpoint device 1000 and the client device C1 is a transmission relying on time-division multiplexing (TDM), the first interface means 1001 comprise an I/O line card for TDM transmission 1002. If the data transmission between the network endpoint device 1000 and the client device C1 is an optical transmission relying on wavelength division multiplexing (WDM), the first interface means 1001 furthermore comprise an I/O line card adapted to perform WDM 1003. A network, relying on the technique of TDM, may be a network of the type Synchronous Digital Hierarchy (SDH) or an Optical Transport Network (OTN).

If the data transmission between the network endpoint device 1000 and the client device C1 is a transmission via data packets, the first interface means 1001 comprise an I/O line card for packet processing 1004.

The first interface means 100 exchange data with a switching matrix SM via an interface IF3. The switching matrix SM also exchanges data with second interface means 1011 via an interface IF4.

The second interface means 1011 are adapted to transmit data to a network N via a network-network interface NNI. If the data transmission between the network endpoint device 1000 and the network N is a transmission relying on time-division multiplexing (TDM), the second interface means 1011 comprise an I/O line card for TDM transmission 1012. If the data transmission between the network endpoint device 1000 and the network N is an optical transmission relying on wavelength division multiplexing (WDM), the second interface means 1011 furthermore comprise an I/O line card adapted to perform WDM 1013. A network, relying on the technique of TDM, may be a network of the type Synchronous Digital Hierarchy (SDH) or an Optical Transport Network (OTN).

If the data transmission between the network endpoint device 1000 and the network N is a transmission via data packets, the second interface means 1011 comprise an I/O line card for packet processing 1014.

The first interface means 1001 are adapted to receive at least one connection request message REQ from the client C1. The request message REQ is a request for a data connection to a remote client. The request message contains the address of the remote client ADR(C2) and indicating data (A) for indicating a predetermined set of network resources.

The network endpoint device 1000 comprises a control system CU which is connected via an interface IF1 to the first interface means 1001 for receiving the request message REQ from the client C1 and for exchanging further messages with the client C1.

The control system CU is adapted to determine a data path using network resources selected from the indicated set of network resources. For this determination, the control system carries out algorithms of the MPLS protocol or the GMPLS protocol, and relies on routing data RD an designating DD stored in a memory unit MU. For exchanging data with the memory unit MU, the control system CU is connected to the memory unit MU via an interface IF5. The designation data DD is provided by the network or the network operator to the network endpoint device 1000 and then stored in the memory unit MU.

For establishing the requested data connection via the determined data path, the control system CU initiates an exchange of messages with network resources according to the MPLS protocol or the GMPLS protocol. This exchange of messages may be carried via a control plane CTRL to which the control system CU is connected via an interface IF6. Alternatively, the control system CU carries this exchange of message out via the second interface means 1011, in which case the control system CU is connected to the second interface means 1011 via an interface IF2.

The control system CU furthermore controls the switching matrix SM, the first interface means 1001 and the second interface means via control interfaces CIF2, CIF1, CIF3 for controlling the exchange of data between the client C1 and the network N.

The control system may be implemented on a single controller board or on multiple controller boards connected to each other via interfaces.

Embodiment of a Client Device

Figure 13:
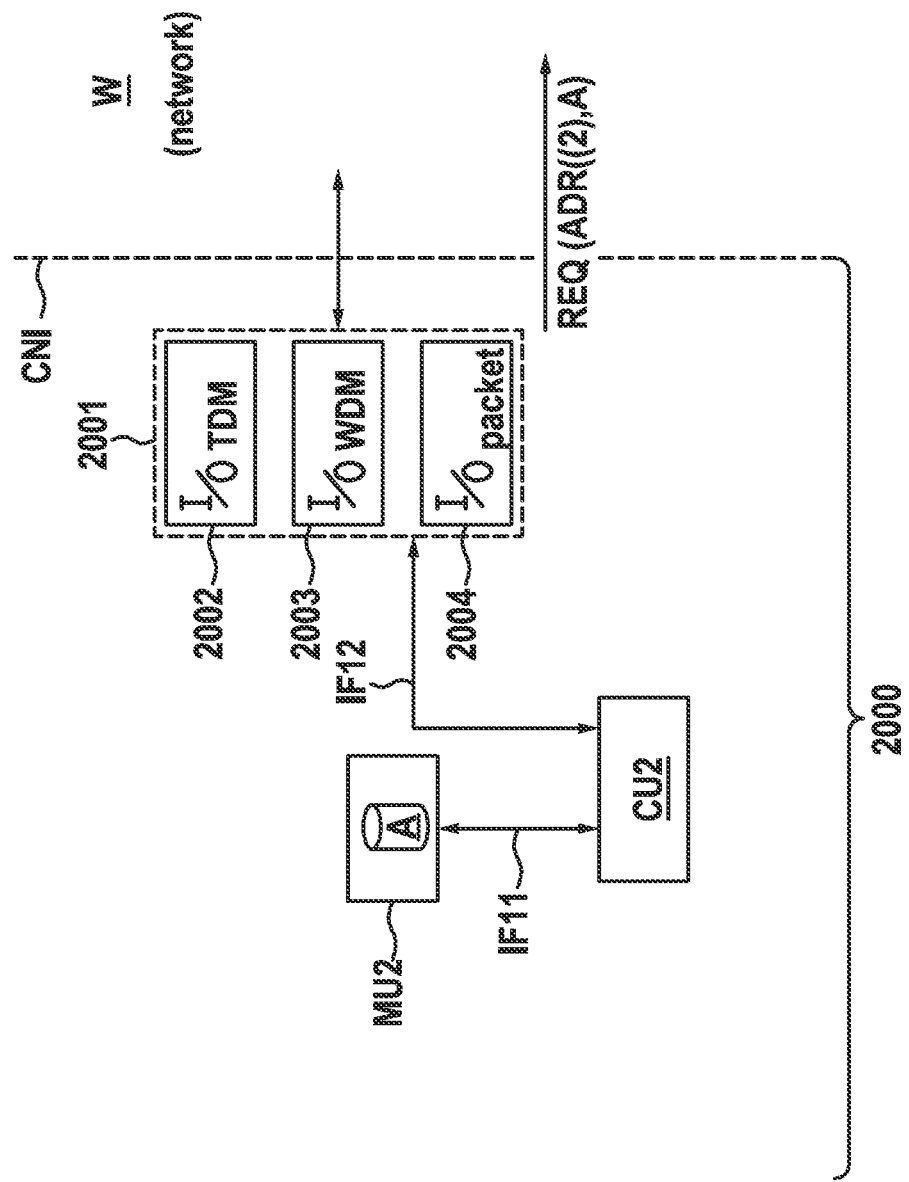
FIG. 13 shows a block diagram of a client device.

An embodiment of a client is proposed as shown in FIG. 13.

The client device 2000 comprises interface means 2001 for data transmission with a network endpoint device of a network N via a client network interface CNI. If the data transmission between the network endpoint device and the client device 2000 is a transmission relying on time-division multiplexing, the interface means 2001 comprise an I/O line card for TDM transmission 2002. If the data transmission between the network endpoint device and the client device 2000 is an optical transmission relying on wavelength division multiplexing, the interface means 2001 furthermore comprise an I/O line card adapted to perform WDM 2003. A network, relying on the technique of TDM, may be a network of the type Synchronous Digital Hierarchy (SDH) or an Optical Transport Network (OTN).

If the data transmission between the network endpoint device and the client device 2000 is a transmission via data packets, the interface means 2001 comprise an I/O line card for packet processing 2004.

The client device 2000 comprises furthermore a memory unit MU2, which is adapted to store at least one indicating data (A). The indicating data (A) indicates a predetermined set of network resources, which is disjoint to further sets of network resources indicated by further indicating data. The at least one indicating data (A) is predetermined data and is provided by the network to the client device 2000.

The client device comprises a control system CU2, which is connected via an interface IF11 for obtaining the indicating data A. The control system is furthermore connected via an interface IF12 to the interface means 2001 for sending to the network endpoint device at least one connection request message. The at least one connection request message contains the indicating data A uniquely identifying a set of network resources. The at least one connection request message is sent for requesting a data connection to a remote client device via a data path using network resources selected from the indicated set of network resources. Furthermore, the request message contains the address of the remote client ADR(C2).

The invention claimed is:

1. A method of establishing disjoint data connections between clients by a network operated by a network operator, comprising the steps of:
   sending, by the network operator, first and second indicating data as predefined data to one or more client devices;
   receiving, by a network endpoint node from a first client device, one or more connection request messages requesting at least two disjoint data connections to a second client device, said one or more connection request messages containing said first indicating data provided by the network operator and uniquely identifying a first predetermined set of network resources for a first data connection and said second indicating data provided by the network operator and uniquely identifying a second predetermined set of network resources for a second data connection, which is disjoint to said first data connection,
   by said network endpoint node establishing said first data connection via a first data path using network resources selected from said first set of network resources uniquely identified by said first indicating data, and establishing said second data connection via a second data path using network resources selected from said second set of network resources uniquely identified by said second indicating data.

2. The method according to claim 1, wherein said indicating data is a data element uniquely identifying a single set of network resources.

3. The method according to claim 1, wherein said network endpoint node sends an indication message to said first client device in the case that said network changes said second data path of said second data connection to a changed second data path resulting in a changed second data connection, which relies on at least one further network resource contained in said first set of network resources.

4. The method according to claim 3, wherein said indication message contains said second indicating data.

5. The method according to claim 4, wherein said indication message contains also said first indicating data.

6. The method according to claim 1, wherein said network resource is one of the following options:
a link between network nodes;
a network node;
a fiber of an optical fiber bundle between network nodes.

7. The method according to claim 1 further comprising the steps of:
sending, via said first client device, a first connection request message containing said first indicating data to a first network endpoint node, and
sending, via said first client device, a second connection request message containing said second indicating data to a second network endpoint node.

8. A network endpoint device for providing a data connection between clients over a network operated by a network operator, comprising:
a first interface means adapted to
provide to clients operatively coupled to the network, indicating data assigned by the network operator and uniquely identifying predetermined disjoint sets of network resources, and
to subsequently receive at least one connection request message from a first client requesting a data connection to a second client device over said network, said request message containing said indicating data uniquely identifying a predetermined disjoint set of network resources,
a memory unit adapted to provide designating data corresponding to the indicating data provided to clients and uniquely designating network resources to disjoint sets of network resources and routing data, and
a control system adapted to
determine a data path using network resources selected from said uniquely identified set of network resources by employing said designating data and said routing data, and
exchange messages with further network devices for establishing said requested data connection via said data path.

9. The network endpoint device according to claim 8, wherein in the case that said network endpoint device is not able to determine said data path, said network endpoint device sends a rejection message to said client device.

10. A client device, operatively coupled to a network operated by a network operator, for requesting disjoint data connections over the network, comprising:
a memory unit adapted to store indicating data assigned by the network operator, said indicating data uniquely identifying a predetermined set of network resources, wherein said uniquely identified set of network resources is disjoint to further sets of network resources indicated by further indicating data, and wherein said indicating data is predefined data provided by the network operator to said client device, and
a controller adapted to send at least one connection request message to a network endpoint device for requesting a data connection to a second client device via a data path using network resources selected from said indicated set of network resources, wherein said request message contains said indicating data provided by the network operator to said client device.

* * * * *